Figure 1:
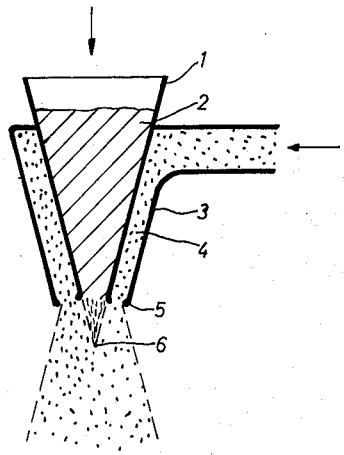
Figure 2:
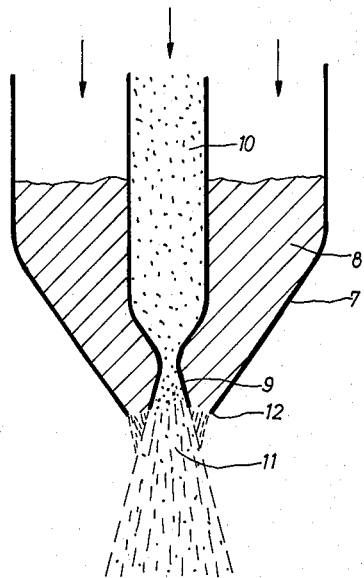
Figure 3:
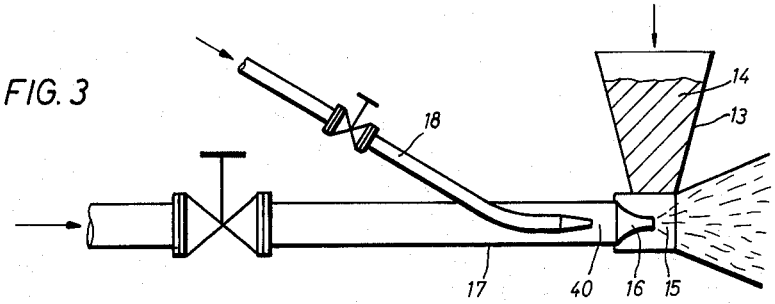
Figure 4:
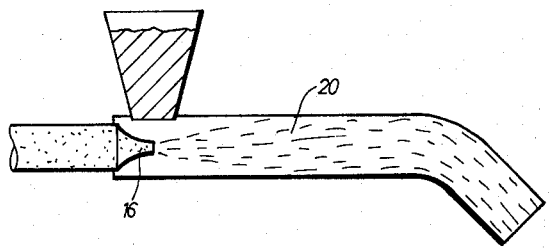
Figure 5:
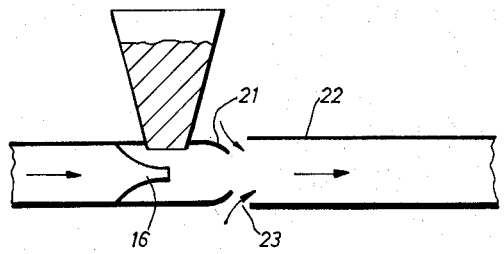
Figure 6:
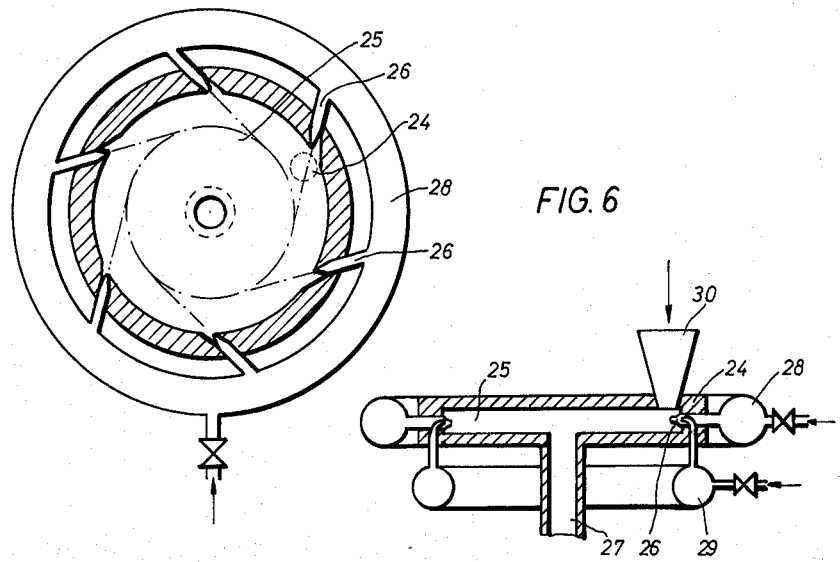
Figure 7:
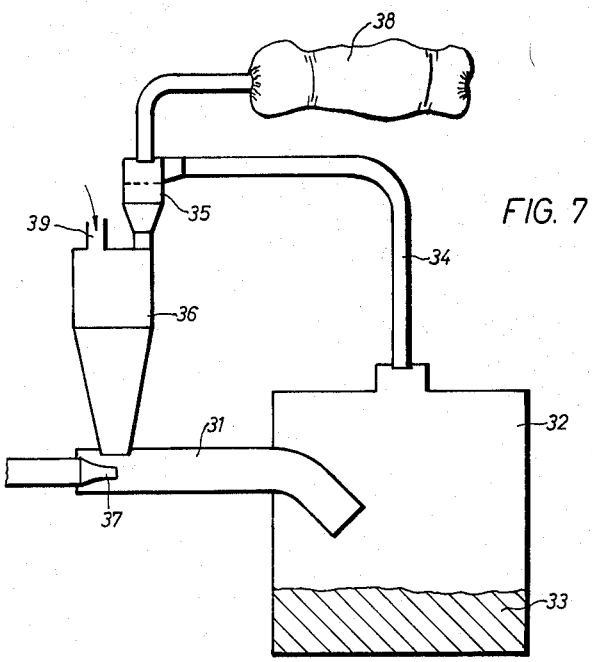

May 17, 1966  A. LIPPERT ET AL  3,251,550
PROCESS AND APPARATUS FOR WETTING OF DRY POWDERED SUBSTANCES
Filed July 2, 1964  3 Sheets-Sheet 1

INVENTORS:
AXEL LIPPERT, RUDOLF ERDMENGER, EDGAR MUSCHELKNAUTZ

BY Burgess, Dinklage + Sprung

ATTORNEYS

INVENTORS:
AXEL LIPPERT, RUDOLF ERDMENGER, EDGAR MUSCHELKNAUTZ.
BY Burgess, Dinklage & Sprung
ATTORNEYS

United States Patent Office 3,251,550
Patented May 17, 1966

3,251,550
PROCESS AND APPARATUS FOR WETTING OF DRY POWDERED SUBSTANCES
Axel Lippert, Leverkusen, Rudolf Erdmenger, Bergisch-Gladbach, and Edgar Muschelknautz, Leverkusen-Bayerwerk, Germany, assignors to Farbenfabriken Bayer Aktiengesellschaft, Leverkusen, Germany, a German corporation
Filed July 2, 1964, Ser. No. 379,949
Claims priority, application Germany, July 5, 1963, F 40,168
6 Claims. (Cl. 239—4)

The wetting of dry powdered substances more especially liquid-repelling substances, with liquids is very difficult. The powder in fact floats on the surface of the liquid as an aggregate with a mean bulk density, made up of the density of the solid substance and the density of the gas contained in the powder. Even an individual particle, on entering the liquid, must first of all overcome the surface tension thereof in order to be completely wetted.

In order to wet liquid-repelling powders more efficiently it has been proposed to reduce the surface tension of the liquid by means of chemical additives (surfactants). These chemical additives, however, contaminate the suspension or the corresponding solution and this is highly undesirable in most cases.

In order to avoid the use of these chemical additives, it has been proposed to granulate the dry powder, prior to wetting, to a porous structure and then to introduce the granulated material into the liquid. Because the bulk density of these granules is increased by comparison with the heap or aggregate, they penetrate more easily into the liquid. In the liquid, the granules break down into the individual particles of which they are composed, if the substance is soluble in the liquid or if the capillary forces of the liquid penetrating into the interior of the granule grain is sufficient to break up the granule structure. However, the production of a porous granulated material from dry dust to satisfy these conditions is only possible in a very few cases and even then only at considerable technical expense.

It is also known to introduce the powder aggregate floating on the liquid surface into the liquid by means of mechanical stirrer devices. In this case, however, the aggregate does not penetrate in the form of separate particles into the liquid, but in the form of balls, which are consolidated in the liquid into lumps and can only be broken up with great difficulty.

An apparatus for the precipitation of dust from a gas-dust mixture is also known in which large quantities of gas suspending a very low concentration of dust are forced through a nozzle through which water is simultaneously sprayed. The flowing dust settles on the slower beads of water, which are accelerated, separates out in a cyclone separator and flows away. However, this process cannot be used for dusts which are difficult to wet, since the dust is not taken up by the beads of water. To precipitate the dust, large quantities of water are necessary. The beads of water forming in the nozzle are large in relation to the particle diameter, so that as many particles as possible encounter the beads or drops.

It has now been found that powdered substances which are difficult to wet can be wetted with liquids, while avoiding the aforesaid disadvantages, if the substance is introduced according to the invention into a stream of a gas-liquid mixture issuing from a nozzle at at least the speed of sound, the introduction taking place at the mouth of the nozzle and outside the latter.

By this means, the dust aggregate is broken down just behind the nozzle opening in a zone of sequential compression impulses from the nozzle jet and the individual particles are combined with the extremely finely atomised liquid droplets of the gas-liquid mixture, having a very different velocity and absorbed. Comminution of the particles of the aggregate does not occur. The jet discharging at the nozzle opening quickly spreads out and transfers its momentum to the particles and the surroundings. The suction effect set up is used to draw the powder into the core of the stream. The powder may be soluble or insoluble in the liquid.

The liquid and the gas are thoroughly mixed before escaping through the nozzle. The liquid quantity must always be small in relation to the gas quantity (about 1:100 to 1:1000), so that the energy of the gas is sufficient to accelerate the liquid in the nozzle up to the speed of sound of the mixture. The liquid leaving the nozzle is atomized into extremely fine droplets, which flow at a very high velocity. The quantity of powder supplied to the nozzle opening can be varied within wide limits (about 0.1 kg. of water/1 kg. of powder up to 100 kg. of water/1 kg. of powder), so that thin, liquid suspensions or very stiff doughs can be obtained.

The droplet formed on atomisation of the gas-liquid mixture has approximately the same size as the dust particles. It impinges at high velocity on the slower minute dust particle, is deformed and finally encloses the particle because its extra kinetic energy existing due to the great difference in velocity. The powder aggregate drawn in by suction is broken up directly after the nozzle opening and each individual powder particle is wetted.

Thin, liquid suspensions are more difficult to produce than a homogeneous stiff paste with a low liquid content, since the intensity of the sonic flow field increases for a low proportion of liquid in the gas stream.

The easily wetted dusts can be formed into a homogeneous stiff or thin paste in a single passage. Dusts which are more difficult to wet are preferably formed into stiff homogeneous pastes in a first passage and then, if desired, further diluted in repeated passages. Firmly adhering agglomerates of the powder can be repeatedly exposed to the sonic flow. For this purpose, it is possible for a substance already formed into a paste to be again drawn into a sonic flow field, in order to obtain a homogeneous substance as well as a further addition of liquid. The same effect is obtained if the pasty substance is injected transversely into a cylinder of small height dimension in comparison to the diameter and the gas-liquid mixture is sprayed in tangentially at the periphery of the cylinder and the paste and the gas are drawn off in the centre. This cylinder acts as a mixing container, in which the granulated materials are destroyed with further dilution by kneading and rubbing. This kneading and rubbing action is also obtained if the stream leaving the nozzle, after taking up the powder, is intercepted by a diffuser or a simple following pipe section which is, for example, curved, the sprayed particles being collected and kneaded together by the strong breaking effect on the walls of the pipe.

The wetting operation can be further assisted by giving the liquid droplets and dust opposite charges. In the dough or paste, the charges are then mutually cancelled out. On the other hand, any existing static charging of the dust can be removed by the wetting operation.

An additional advantage of the process is that the transport volume can be considerably lowered if only the dust or slightly doughy material has to be despatched to the place of use, where it can be formed into a paste or further diluted in accordance with the invention with the suspension agent which can often be easily provided.

Embodiments of apparatus for carrying the process according to the invention into effect are shown diagrammatically by way of example in the drawing.

FIG. 1 shows a nozzle with powder added into the core of the stream of gas and liquid mixture, using unidirectional flow.

FIG. 2 shows a nozzle with powder added into the periphery of the stream of gas and liquid mixture, using unidirectional flow.

FIG. 3 shows a nozzle in which the powder is supplied transversely to the stream of gas and liquid mixture.

FIG. 4 shows a nozzle similar to that in FIG. 3 but with a pipe connected to the nozzle.

FIG. 5 shows a nozzle similar to that in FIG. 3, but with an intercepting diffuser connected to the nozzle.

FIG. 6 shows a flat cylindrical wetting chamber and several gas/liquid mixture nozzles opening tangentially therein and at least one powder supply device arranged transversely of the nozzle stream.

FIG. 7 shows a wetting assembly with a collecting container, a gas-extraction device and a means for returning that dust which is still not wetted.

The powder 2 supplied through a hopper 1 (FIG. 1) is broken up and wetted in the zone of the shock waves 6 in a gas-liquid mixture 4 which is supplied through an annular passage 3 and which is accelerated in an annular nozzle 5 to the speed of sound.

In the wetting arrangement shown in FIG. 2, the product 8 is supplied in a hopper 7 surrounding the nozzle 9 is wetted with the gas-liquid mixture 10 accelerated in the nozzle 9 to supersonic velocity and in the zone of the shock waves of the stream 11. In this case, the product is supplied around the stream through the slot 12.

In the wetting arrangement shown in FIG. 3, the powdered product 14 supplied in a hopper 13 is fed transversely of the gas and liquid stream 15. A liquid supply pipe 18 opens into the gas supply pipe 17 just before the nozzle 16.

The wetted mixture of gas, liquid and dust is collected and mixed by a straight or curved pipe 20 connected to the nozzle 16 (FIG. 4).

In order to permit gas to be additionally drawn in by the stream, an intercepting or collecting diffuser 22 is arranged in front of the nozzle 16 (FIG. 5). The mixture of gas, liquid and dust enters through a small constriction 21 into the diffuser 22. More gas is drawn in through the slot 23 under suction.

The wetting chamber shown in FIG. 6 is provided with a plurality of nozzles 26 which open tangentially into the chamber 25. The dust-like material to be wetted is supplied to the chamber 25 through the hopper 30. The opening of the hopper lies in the wetting zone 24 just in front of the outlets of the nozzles 26. Gas under pressure is supplied through the annular pipe 28 and liquid under pressure is supplied through the annular pipe 29 to the nozzle, and together they are accelerated in the nozzle to sonic velocity. The chamber with a plurality of injection nozzles 26 is quite suitable to effect homogenisation and dilution of the wetted dust. The product prepared is extracted from one chamber through a short pipe 27.

In the wetting assembly shown in FIG. 7 the wetted product 33 ejected from the mixing pipe 31 into the container 32 collects on the bottom or in the liquid the container, while the gas is removed by suction at the cover of the container 32 through a pipe 34. Any dust particles which may still be contained in the gas are separated out in a cyclone 35 and again supplied to the nozzle 37 through a hopper container 36 with newly supplied product added through pipe 39. The gas is further purified behind the cyclone 35 in a filter 38.

The nozzles of the wetting arrangements are advantageously of the Laval type, which are expediently connected to a system comprising two throttled supply pipes for gas and liquid (see, for example, FIG. 3). The gas is mixed with the liquid in a preliminary path ahead of the nozzle (mixing zone 40 in FIG. 3), by throttling both supply pipes in a suitable proportion relative to the preliminary path. The pressure in the preliminary path must always be at least twice as high as that after the nozzle at the outlet of the stream and always lower than the pressure in the supply pipes for gas and liquid.

We claim:

1. A process for wetting powdered liquid repellant substances which comprises passing a stream of gas containing liquid particles in admixture therewith through a nozzle to accelerate said gas-liquid particle stream to at least sonic velocity at the exit of the nozzle, and introducing such powdered substance into said accelerated stream at the exit of the nozzle by means of the suction forces created by said accelerated stream whereby said powdered substance is divided into fine particles for wetting by collision with the liquid particles in said accelerated stream.

2. The process according to claim 1 including the steps of applying an electric charge of one polarity to the liquid particles in said stream and applying an electric charge of opposite polarity to the powdered substance to aid the collision between particles of said powdered substance introduced into said accelerated stream and said liquid particles therein.

3. An apparatus for wetting powdered substances which comprises conduit means disposed for communication with a source of pressurized gas to generate a stream of gas flowing therethrough, liquid supply means disposed in communication with said conduit means for introducing a liquid in finely divided particle form into said gas stream in admixture therewith, a nozzle having an inlet disposed in communication with said conduit means for accelerating said gas-liquid particle stream to at least sonic velocity at the exit of said nozzle, means for supplying a powdered substance to said accelerated stream, said supply means being disposed to introduce said powdered substance into said accelerated stream at and beyond the exit of said nozzle under the influence of suction forces created by said stream thereat whereby said powdered substance is divided into fine particles for wetting by collision with the liquid particles in said accelerated stream.

4. The apparatus according to claim 3 including a collecting diffuser disposed to receive said accelerated stream carrying the wetted powdered substance particles and to introduce additional gas into said stream.

5. An apparatus for wetting powdered substances which comprises a flattened cylindrical chamber, a plurality of nozzles extending into said chamber for introducing respective gas-liquid particle streams into said chamber, said nozzles being disposed to induce a tangentially circulating gas-liquid particle stream flowing at at least sonic velocity within said chamber, means for supplying a powdered substance to said circulating stream, said supply means being disposed to introduce said powdered substance into said circulating stream under the influence of suction forces created thereby to divide said powdered substance into fine particles for wetting by collision with the liquid particles in said circulating stream.

6. The apparatus according to claim 5 wherein said flattened cylindrical chamber has a centrally disposed outlet for discharging the wetted particles of said powdered substance.

References Cited by the Examiner

UNITED STATES PATENTS

| | | | |
|---|---|---|---|
| 1,770,011 | 7/1930 | Poston | 239—336 |
| 1,863,924 | 6/1932 | Dunn | 239—336 |
| 2,006,757 | 7/1935 | Bostrom et al. | 239—336 |
| 2,934,241 | 4/1960 | Akesson | 239—8 |
| 2,944,029 | 7/1960 | Jones et al. | |
| 3,038,750 | 6/1962 | Nielsen | 239—424 |
| 3,100,724 | 8/1963 | Rocheville | 239—8 |
| 3,118,459 | 1/1964 | Stumpf | 118—308 |
| 3,121,533 | 2/1964 | Sedlacsik | 239—3 |
| 3,178,121 | 4/1965 | Wallace | 239—601 |

FOREIGN PATENTS 203,241   1/1906   Austria.

M. HENSON WOOD JR., *Primary Examiner.*

R. S. STROBEL, *Assistant Examiner.*